Nov. 25, 1941. J. J. WYDLER 2,264,126
ENGINE SUPERCHARGER
Filed June 3, 1939 3 Sheets-Sheet 1
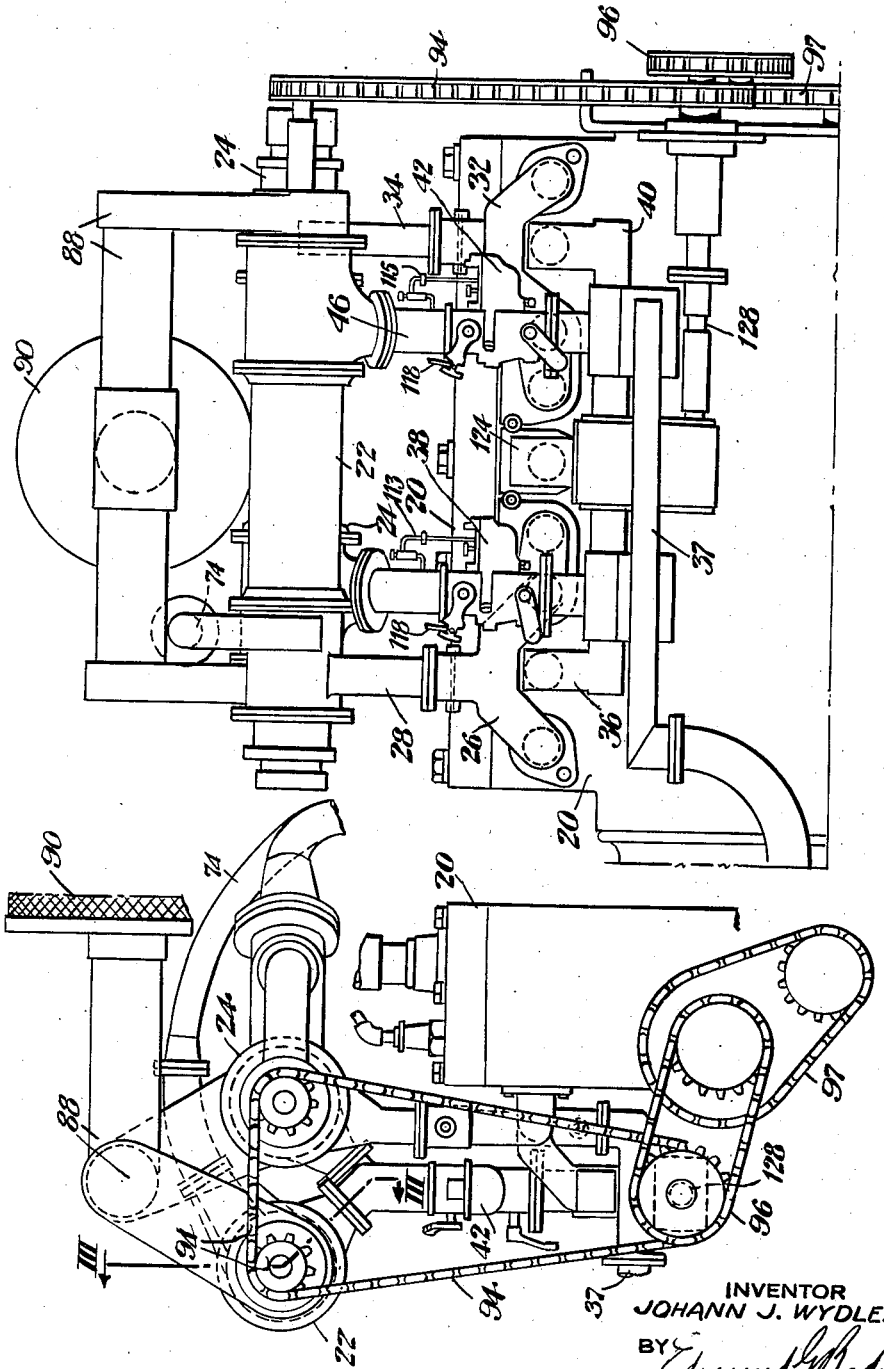
Fig.I.
Fig.II.
INVENTOR
JOHANN J. WYDLER
BY
Edmund G. Borden
ATTORNEY Nov. 25, 1941. J. J. WYDLER 2,264,126
ENGINE SUPERCHARGER
Filed June 3, 1939 3 Sheets-Sheet 2
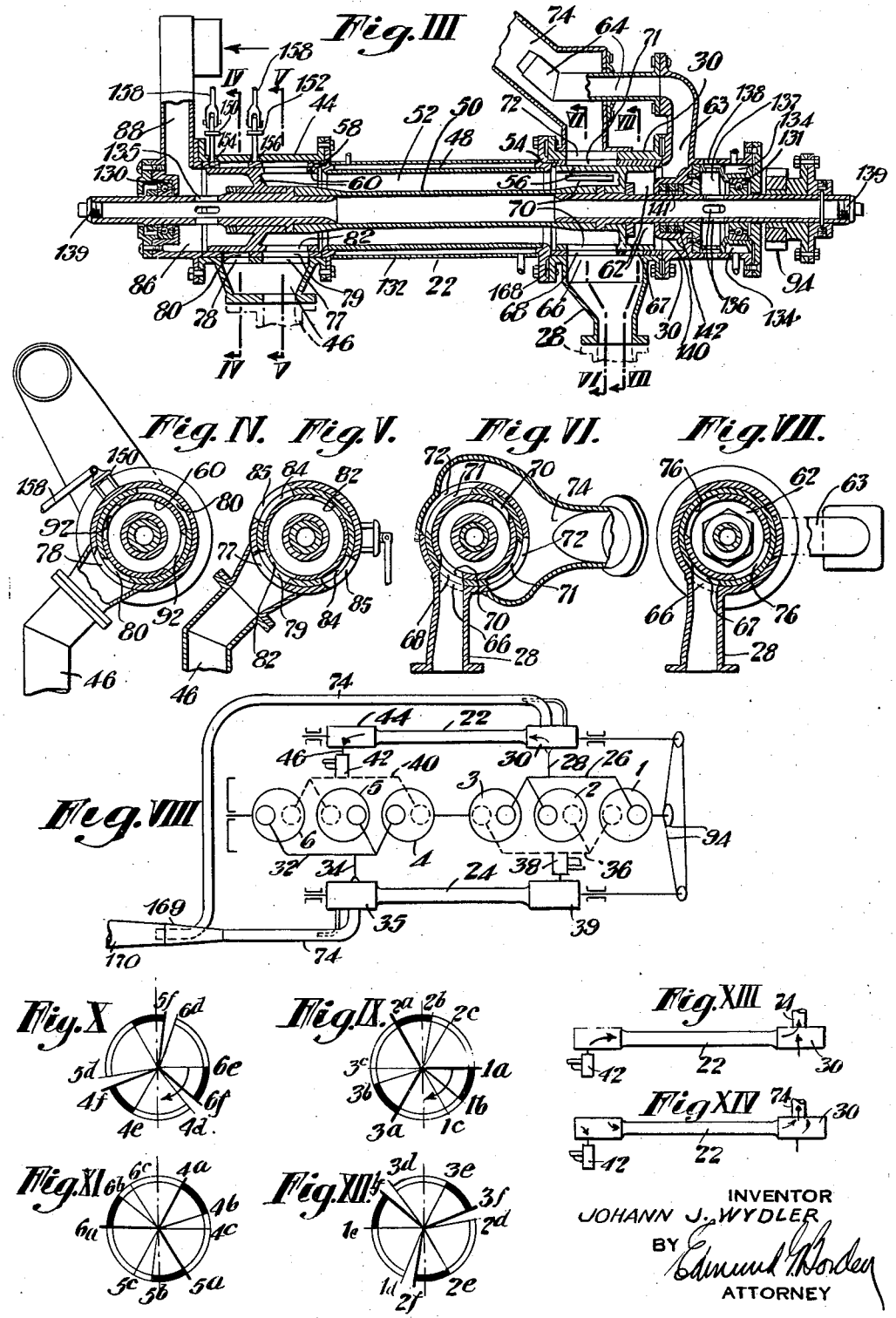
INVENTOR
JOHANN J. WYDLER
BY
ATTORNEY Nov. 25, 1941.   J. J. WYDLER   2,264,126
ENGINE SUPERCHARGER
Filed June 3, 1939   3 Sheets-Sheet 3
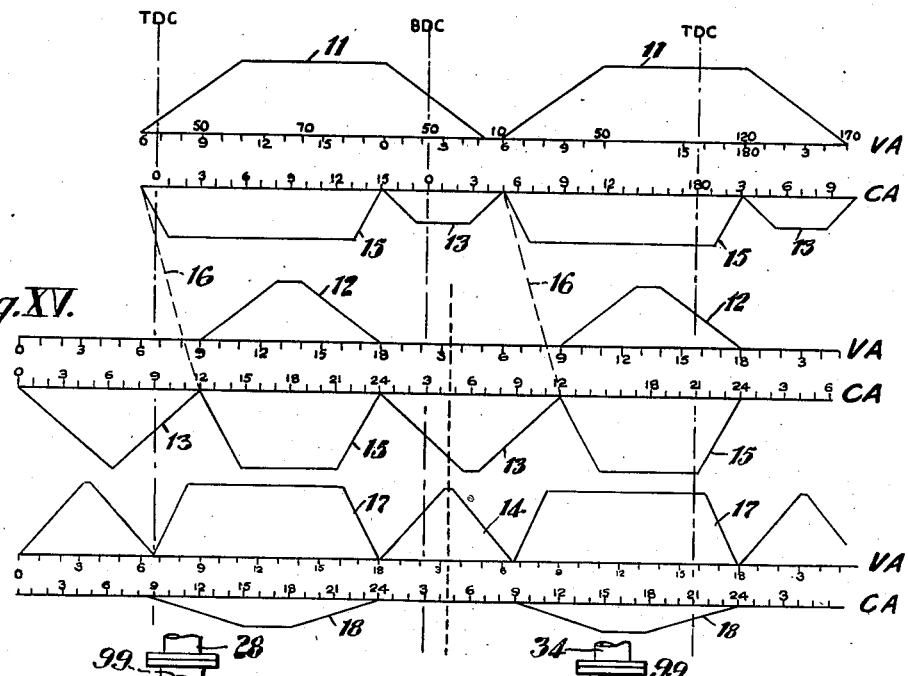
Fig. XV.
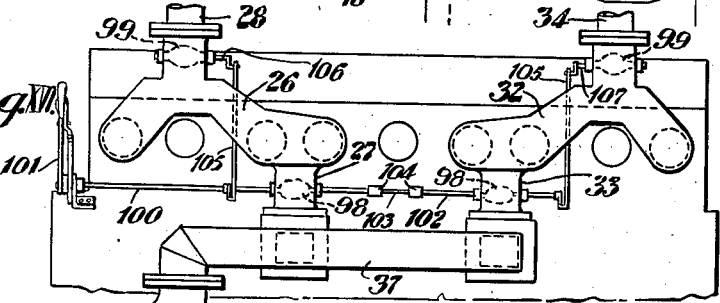
Fig. XVI.
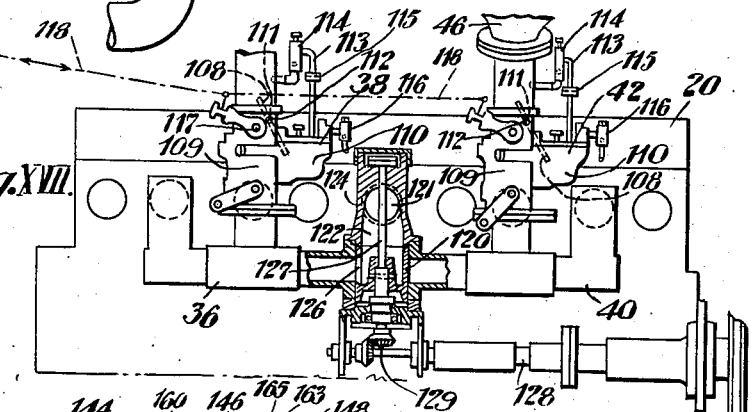
Fig. XVII.
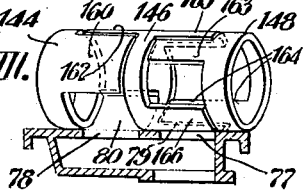
Fig. XVIII.
INVENTOR
JOHANN J. WYDLER
BY Edmund W. Borden
ATTORNEY Patented Nov. 25, 1941

2,264,126

UNITED STATES PATENT OFFICE 2,264,126

ENGINE SUPERCHARGER

Johann J. Wydler, Westfield, N. J., assignor, by mesne assignments, to Cities Service Oil Company, New York, N. Y., a corporation of Pennsylvania Application June 3, 1939, Serial No. 277,162

10 Claims. (Cl. 123—119)

This invention relates to internal combustion engines, and more particularly to an improved apparatus for deriving energy from engine exhaust gases, and utilizing such energy for compressing air for supercharging the engine.

The gas exhaust period of the cycle of any four cycle internal combustion engine cylinder consists of two parts. During the first part of the exhaust period, just after the exhaust valve has been opened, a substantial proportion (roughly, 50%) of the total weight of gas in the cylinder is rapidly discharged as a high pressure "puff" wave moving outwardly from the cylinder into the exhaust manifold at high initial pressure and at high velocity. During the latter part of the exhaust period the remaining portion of the exhaust gases leave the cylinder under a relatively low pressure head and moderate velocity in front of the advancing piston; this period of the cycle being referred to as the "stroke" period of the exhaust.

The present invention is directed to an improvement on that described in the copending joint application of Robert G. Griswold and Johann J. Wydler, Serial No. 240,014, filed November 12, 1938, for "Engine supercharging." According to the invention of the aforesaid joint application, a displacement compressor is employed as the medium for compressing air for supercharging one cylinder of a multicylinder, four cycle internal combustion engine, by means of the pressure energy of the coinciding "puff" discharge wave of exhaust gases leaving another cylinder of the engine which is operating 360° apart in crank angle phase with respect to the first cylinder. This displacement compressor operates as a gas piston pump or compressor in which a body of air first introduced into the pump chamber is compressed and then discharged by a nonturbulent stratified layer or wave of hot exhaust gases under higher pressure moving forward in direct contact with and displacing the air in the pump chamber, without substantial mixing with and contamination of the air by the gas.

The principal object of the present invention is to provide an improved apparatus for increasing the power output and the efficiency of a multicylinder four cycle internal combustion engine.

According to the present invention, a multicylinder engine is provided with a sufficient number of exhaust manifolds and air compressing units to insure that the exhaust puff waves in any exhaust manifold connected to a compressor shall not follow each other at intervals shorter than 180° crank angle. At least two displacement compressors and at least two intake manifolds with individual carburetors are employed whereby the puff exhaust waves from one group of engine cylinders can be utilized in one compressor for compressing air for supercharging the other group of cylinders; as for example, cylinders 1, 2, and 3 in one group, and 4, 5 and 6 in another group. A special center distributing valve has also been provided for engines in which the intake ports of the two middle cylinders, 3 and 4 are Siamesed, in order to connect in a cyclic sequence cylinders 3 and 4 to their respective branches of intake manifolds for cylinders 1, 2 and 3, and 4, 5 and 6.

Another feature of the present invention is that an improved design of displacement compressor or supercharger pump is provided having relatively rotatable valves and housing therefor, together with mechanism for adjusting the area and timing of the valve ports controlling transfer of atmospheric and supercharge air and exhaust gases. Special carburetor pressure balancing adjustment mechanism and check valves are also provided to insure satisfactory operation of the engine with and without supercharging. A preferred supercharger design embodies a pair of rotary cylinder valves and adjustable sleeves therefor, located respectively at the hot and cold gas ends of each displacement compressor. The single valve at the cold end is designed to control and properly time the periods of engine atmospheric air intake, pump discharge of compressed air, and air scavenging of the pump. The valve at the hot end operates to control and time the periods of pump intake of engine puff exhaust gases, discharge of exhaust gases from the pump, and transfer of engine stroke exhaust gases to suction aspirators.

The air compression and displacement period in the operating cycle of each displacement compressor is followed by a scavenging period during which the exhaust gases are discharged from the compressor and the compressor is scavenged with atmospheric air. A major part of the energy for such scavenging operation is preferably derived from the exhaust gases which are discharged from the exhausting engine cylinder during the stroke part of the cylinder exhaust cycle. To provide an additional scavenging effect, the gas exhaust ducts of the respective displacement compressors are preferably interconnected by concentric twin nozzles, each of which operates to develop repeated suction impulses at the respective compressor exhaust ports during one and the same scavenging period.

With the above and other objects and features in view, the invention consists in the improved apparatus for compressing air and for supercharging a four cycle internal combustion engine, which is hereinafter described and more particularly defined by the accompanying claims.

The invention will hereinafter be described with particular reference to the accompanying drawings, in which:

Fig. I is a view in side elevation of a six cylinder four cycle internal combustion engine-air-supercharger assembly in accordance with the present invention;

Fig. II is a view in end elevation, showing the engine supercharger assembly of Fig. I;

Fig. III is a horizontal sectional view of a preferred design of displacement air compressor;

Fig. IV is a vertical sectional view of the air transfer ports and control valve therefor, taken on the line IV—IV of Fig. III;

Fig. V is another vertical sectional view through the air transfer port end of the compressor, taken on the line V—V of Fig. III;

Fig. VI is another vertical cross sectional view through the hot gas transfer port end of the supercharger, taken on the line VI—VI of Fig. III;

Fig. VII is still another vertical cross sectional view through the hot gas transfer port end of the supercharger, taken on the line VII—VII of Fig. III;

Fig. VIII is a diagrammatic view illustrating the hook-up of all six cylinders of a six cylinder engine, through a pair of exhaust manifolds and a pair of intake manifolds and carbureters, with a pair of displacement compressors;

Fig. IX is a polar diagram of the exhaust cycles of three of the engine cylinders operatively connected with one of the displacement compressors shown in Fig. VIII;

Fig. X is a polar diagram of the air intake cycles of three cylinders which are operatively connected to the same compressor with which the exhausting cylinders of Fig. IX are connected;

Fig. XI is a polar diagram of the exhaust cycles of three cylinders connected to the other displacement compressor shown in Fig. VIII;

Fig. XII is a polar diagram of the air intake cycles of three cylinders operatively connected to the same compressor to which Fig. XI relates;

Fig. XIII is a diagrammatic view illustrating by means of arrows the flow of gases during the re-expansion period in the operating cycle of the upper displacement compressor shown in Fig. VIII. In Fig. VIII the direction of flow of air and gas during the puff supercharging period is indicated;

Fig. XIV is a diagrammatic view of the atmospheric air intake period of the scavenging cycle of the upper compressor illustrated in Fig. VIII, and of the simultaneous atmospheric air intake of the engine cylinder next in cycle with the pump;

Fig. XV presents scale diagrams illustrating possible variations in the port openings of a displacement compressor when connected to an engine operating both normally and with supercharging;

Fig. XVI is a view in side elevation of a part of the engine of Fig. I showing the two exhaust gas manifolds and butterfly valve actuating mechanism for switching connection between the manifold and the respective supercharger exhaust transfer conduits and the engine exhaust muffler;

Fig. XVII is a side elevation, with parts shown in section, of the air intake manifold and carburetors and the central switching valve for the Siamesed intake ports of the two middle cylinders of the engine; and Fig. XVIII is a perspective view of the three-sectioned adjustable sleeve which journals the rotary valve at the air transfer end of the displacement compressor.

The apparatus illustrated in Figs. I and II includes a six cylinder four stroke cycle internal combustion engine 20 and two displacement air compressors 22 and 24 which are operatively connected for compressing air at the expense of energy derived from the engine exhaust gases, and utilizing the compressed air for supercharging the engine. In its broadest scope, however, the invention is not limited to the use of the compressed air for engine supercharging; nor is the invention limited in application to an engine having six cylinders.

In Fig. VIII the cylinders of a six cylinder, four cycle engine have been numbered respectively 1, 2, 3, 4, 5 and 6; and cylinders 1, 2 and 3 have been shown with their exhaust ports connected through an exhaust manifold 26 and conduit 28 to a hot gas inlet valve housing 30 at one end of compressor 22; while the exhaust ports of cylinders 4, 5 and 6 have been shown as connected through an exhaust manifold 32 and conduit 34 to the hot gas inlet valve housing 35 at one end of compressor 24. Likewise the intake ports of cylinders 1, 2 and 3 have been shown as connected through an intake manifold 36 and carbureter 38 to an air valve housing 39 at the other end of compressor 24; while the intake ports of cylinders 4, 5 and 6 have been shown as connected through an intake manifold 40, carbureter 42 and pipe 46 to an air valve housing 44 at the other end of compressor 22 (Fig. III).

Referring to Figs. IX and XII inclusive, it will be noted that while cylinder 1 is starting its gas exhaust 1a—1b (Fig. IX), cylinder 6 is finishing its air intake 6e—6f (Fig. X). Likewise, while cylinder 4 is starting its gas exhaust 4a—4b (Fig. XI), cylinder 3 is finishing its air intake 3e—3f (Fig. XII). Likewise, while cylinder 5 is starting its gas exhaust 5a—5b (Fig. XI), cylinder 2 is finishing its air intake 2e—2f (Fig. XII). In other words, the cylinders of a multi-cylinder engine must be paired in practicing the preferred supercharging operation of this invention, so that the energy carried by the exhaust gas discharged from one cylinder of a pair can be utilized for compressing the air introduced into the other paired cylinder at the end of its intake period. During the first part of the air intake period for each cylinder air is supplied at atmospheric pressure. The pistons in each cylinder of a pair, such as 2 and 5, pass simultaneously through their top and bottom dead center positions. However, the power strokes of the pistons are 360° crank angle apart in phase. In the case of engines having an uneven number of cylinders, as for example nine cylinders, the dead center positions of the pistons in paired cylinders are not exactly together (for example 40° apart) and therefore the power strokes are apart in phase less than 360° (for example 320°).

The displacement compressors or superchargers 22 and 24 are identical in design. Each has a cylindrical main housing 48 which preferably has a length several times its maximum internal diameter (Fig. III). Valve housings 30 and 44 of supercharger 22 are shown as attached respectively to the opposite ends of housing 48 as extensions thereof. A hollow valve drive shaft 50 is mounted within the housing 48, extending from end to end thereof along the longitudinal axis of the supercharger. Displacement and compression chamber 52 of the supercharger is of annular cross section and lies between the inner wall of the housing 48 and the outer circumference of the shaft 50. The chamber 52 preferably has a cubic capacity only sufficient to handle the volume of hot gas which is discharged from a single engine cylinder during the first or puff portion of its exhaust, and to compress only the air with which a cylinder is supercharged at the end of its air intake period. Within that extension 30 of the supercharger 22 into which hot exhaust gases are admitted from exhaust manifold 26, there is mounted an apertured cylindrical sleeve or bushing 54 within which is journaled a ported cylinder valve 56. The hub of valve 56 is keyed to shaft 50 for rotation therewith. Within the valve housing 44 at the opposite end of the supercharger, there is assembled a multi-sectioned apertured cylindrical sleeve or bushing 58 within which is journaled a ported cylinder valve 60. Valve 60 has a hub which is preferably fastened to shaft 50 by a set screw for rotation therewith. The imperforate web extensions of the hubs of valves 56 and 60 which attach the cylindrical valve walls to the hubs, form end wall closures for the compressor chamber 52.

Referring to Figs. III, VI and VII, it will be seen that that end of the supercharger 22 into which hot exhaust gases are introduced from the exhaust manifold 26 houses an annular gas by-pass chamber 62 which is in permanent communication with the atmosphere through a funnel 63 and an aspirator pressure nozzle 64. The hot gases from manifold 26 are conducted by conduit 28 to a permanent aperture 66 in the wall of valve housing 30. That portion of sleeve 54 which overlies housing aperture 66 is also provided with two apertures 67, 68, which register with the aperture 66. Valve 56 is provided with a pair of identical ports 70 in opposite sides of that portion of its cylindrical wall which is rotatably aligned with sleeve aperture 68. Sleeve 54 and valve housing 30 are also provided respectively with registering aperture 71, 72, which are adapted to communicably connect the interior of housing 30 and sleeve 54 with a gas discharge funnel 74. That portion of the cylindrical wall of valve 56 which lies to the right of the hub web, as viewed in Fig. III, is also provided with a pair of identical oppositely disposed wall ports 76 (Fig. VII), which on rotation of the valve about 30°–40° clockwise from the position illustrated in Figs. III and VII, will come into register with the apertures 66 and 67.

Valve housing 44 at the opposite end of the compressor is permanently apertured at 77 and 78 (Figs. III, IV and V). Sleeve 58 is also provided with wall apertures 79 and 80 which normally register with apertures 77 and 78, respectively. Valve 60 is provided with a pair of identical ports 82 in opposite sides of that portion of its cylindrical wall which is rotatably aligned with apertures 77 and 79. When valve 60 is rotated about 90° clockwise from the position illustrated in Fig. V, its ports 82 are moved into full register with other apertures 84 and 85 located respectively in the walls of sleeve 58 and housing 44. An air by-pass chamber 86 is formed within valve housing 44 to the left of the hub web of the valve as viewed in Fig. III. Chamber 86 is permanently connected to atmosphere through an air supply conduit 88 and filter 90 (Fig. II). As shown in Fig. IV, that portion of the cylindrical wall of valve 60 which lies to the left of the hub web, as viewed in Fig. III, is provided with a pair of oppositely disposed identical ports 92 which, on rotation of the valve about 90° clockwise from the position illustrated in Figs. III and IV, will come into full register with apertures 78 and 80.

Thus with the shaft 50 and valves 56 and 60 in place, the displacement compressor comprises a pair of short annular chambers 62 and 86 located at opposite ends thereof, each chamber being permanently connected to the outside atmosphere, together with a long displacement air compression chamber 52 of annular cross section lying between shaft 50, housing 48 and the hubs of valves 56 and 60.

The engine 20 is of course equipped with the usual air and fuel valves and exhaust valves for each cylinder intake and exhaust port. Combustion within any cylinders of the engine is initiated by means of a spark plug, the timing of which is controlled by a distributor. The engine intake and exhaust valves and the distributor are all actuated from the engine through a cam shaft which operates at half the speed of the engine crank shaft. The drive shafts 50 for the valves 56 and 60 in each of the compressors 22 and 24 are driven at three-fourths the speed of the engine through suitable drive mechanism such as the chain and gear drives 94, 96, 97, which are illustrated in Figs. II, III, VIII.

To permit engine 20 to be operated without operating the superchargers 22 and 24, two pairs of butterfly valves 98, 99 are mounted respectively in engine exhaust pipe connections 27 and 33, and in the conduits 28 and 34 (see Fig. XVI). With the valves 98 open and the valves 99 closed, the engine cylinders 1–6 inclusive, are exhausted directly through an exhaust pipe 37 to atmosphere; while with valves 99 open and valves 98 closed, the hot engine exhaust gases are forced to pass through the transfer lines 28 and 34 and then into the corresponding superchargers 22 and 24, or to the aspirator nozzles 64 for the respective superchargers. Any hot exhaust gas which is admitted to one of the superchargers is ultimately exhausted to atmosphere through the exhaust pipes 74 connected with the superchargers. The valves 98, 99, are connected for simultaneous actuation by mechanism which may comprise a shaft 100 having a handle 101, the shaft 100 forming the stem of one of valves 98. Stem 102 of the second valve 98 is operatively connected to a slot in the end of shaft 100 by a flat spring steel link 103 held in place by collars 104. A pair of crank arm links 105 operatively connect each of the stems of the respective valves 98 with the corresponding stems 106, 107 of valves 99. The flexible link 103 is provided to insure full closing and opening of all the butterfly valves without application of such pressure to the valve stems as would cause valve warping or distortion. The two butterfly valves 98 and 99 at the right side of link 103 are given an operating angle about 10° smaller than the pair of valves at the left side of the link, as viewed in Fig. XVI.

Carbureters 38 and 42 may be the usual type of float controlled carbureters which supply fuel from a constant level float chamber to a fuel admission nozzle mounted in the path of air flowing toward the engine intake manifold. However, according to the present invention, an internal tubular passage 108 (Fig. XVII) is provided connecting each carbureter mixing chamber 109 with the top of the float chamber 110. There is also an orifice 111 in passage 108, the size of which can be adjusted by an external adjusting screw 112. A tube 113 is also provided connecting the top of the float chamber with the interior of the riser pipe 46 which connects the carbureter with the intake manifold, and an adjustable spring controlled check valve 114 and fixed throttle orifice 115 are introduced in pipe 113. A non-return or check valve 116 is also introduced into the gasoline feed line to the carbureter float chamber. By these added controls, the carbureters have been adapted for delivering suitably proportioned mixtures of fuel and air both when the engine 20 is being operated without supercharging and with supercharging. Each carbureter is provided with the usual throttle valve 117 at the base of the riser, and with the usual valve actuating mechanism 118, to allow for operation of the engine 20 with or without supercharging and with various throttle openings.

In the engine illustrated in Fig. VIII, the intake ports of cylinders 1 and 2 and 5 and 6 are Siamesed and connected respectively to intake manifolds 36 and 40. There are some six cylinder, four cycle internal combustion engines, however, in which the intake ports of cylinders 3 and 4 are also Siamesed, and an engine of this type is illustrated by Figs. I, XVI and XVII. To adapt an engine of this type for operation with two intake manifolds operatively connected respectively to the intake ports of cylinders 1, 2 and 3, and 4, 5 and 6, a switching valve must be provided such as valve 120 (Fig. XVII) whereby to alternately connect the Siamesed intake ports of cylinders 3 and 4 to their respective intake manifolds 36 and 40. Conduit 121, which leads to the intake ports of cylinders 3 and 4, is ported out of a chamber 122 in housing 124 of valve 120. The valve is a ported cylinder valve having a single port 126. Valve 120 is keyed to a shaft 127 which is driven at one-half engine crank shaft speed from shaft 128 by suitable link mechanism 129. The intake ports of cylinders 3 and 4 operate 360° apart in crank angle travel, and valve 120 is rotated at a speed which serves to alternately connect these cylinder intake ports through conduit 121, chamber 122 and valve port 126 with the proper branch intake manifolds 36 and 40.

The valve drive shaft 50 for each supercharger is journaled at opposite ends of the supercharger on ball bearings 130 and 131 (Fig. III). An important feature in the design of the supercharger is the provision of means for limiting transfer of heat from the hot gas end to the cold air transfer end of the supercharger and to the valve shaft bearings on the hot side. This protection may include a water jacket 132 for the main section 48 of the supercharger, together with an annular water cooled compartment 134 around or adjacent bearing 131. Means are also shown for cooling the bearing 131 at the hot gas intake side of the supercharger by air ventilation. To effect this, apertures 135 are provided in that portion of the wall of shaft 50 which rotates in air intake chamber 86. Additional wall apertures 136 are provided in that portion of the shaft which is centered in a chamber 137 within which the bearing 131 is mounted. Apertures 138 are also ported out from chamber 137 through the supercharger housing, and the ends of the hollow shaft 50 are closed by plugs 139. By this arrangement, a cooling draft of air can enter chamber 137 from the outside atmosphere and flow thence through the hollow bore of shaft 50 into air intake chamber 86 during that portion of the cycle of each engine cylinder during which air at atmospheric pressure is being taken into the cylinder. To seal the bearing 131 against contact with the hot gases entering the chamber 62 of the supercharger, a partition stuffing box 140 is mounted between chamber 62 and air chamber 137. Essentially this stuffing box comprises a housing for a plurality of shim stock seal rings 141 encircling the shaft 50 and separated from each other by spacing rings 142. All the rings are prevented from rotating with the shaft by a key; however, they are fitted loosely with respect to each other and with a minute clearance on the shaft to permit true self-centering adjustment on the shaft.

When operating engine 20 with supercharging, the air supply end of the supercharger with its rotary valve 60, must function to: (a) transfer air at atmospheric pressure through chamber 86 to the intake port of a cylinder operatively connected to the supercharger (period 4d—4e, Fig. X) during the major part of the cylinder intake period (Fig. XIV); (b) cut off the atmospheric air transfer and transfer compressed air from the supercharger chamber 52 as a puff supercharging wave through the carbureter into the intaking cylinder at the end of the intaking period (Figs. III, V and VIII); (c) simultaneously with at least part of the atmospheric air transfer period (a), admit scavenging air from atmosphere through ports 85, 84, 82, into the supercharger chamber 52 (Fig. XIV, and periods 1c—3a, Fig. IX). Likewise, the hot exhaust gas receiving end of the supercharger with its rotary valve 56 must function to: (d) introduce the first or puff exhaust gas discharge from a cylinder operatively connected to the supercharger into the chamber 52 during the supercharging period (b) (Figs. III, VI and VIII); (e) cut-off transfer of exhaust gas to chamber 52 and switch the exhaust gas discharge during the second or stroke portion of the engine exhaust into the aspirator pressure nozzle 64 (Figs. XIII, XIV); (f) simultaneously with actions (c) and (e) open the connection between 52 and exhaust discharge funnel 74 for the purpose of scavenging the supercharger before beginning a new cycle. When operating the engine normally without supercharging, the air supply end of the supercharger and valve 60 should also function to (g) transfer atmospheric air to the engine intaking cylinder connected therewith throughout the entire intake period.

In order to enable the air supply end of the supercharger and valve 60 to function as specified under a, b, c, and g, sleeve 58 has been designed in three ring sections, 144, 146 and 148 (Fig. XVIII), and two of these sections 144 and 146, have been made rotatably adjustable within housing 44 for the purpose of varying the length of time during which sleeve ports 89 are in position to allow air passed by valve ports 92 to be transferred to conduit 46. Sleeve sections 144 and 146 are provided respectively with handles 150 and 152 (Fig. III) extending to the outside of housing 44 through arcuate slots 154 and 156 in the housing. Actuating mechanism 158 is provided attached to handles 150 and 152 of the sleeve sections 144 and 146 at the air intake ends of both superchargers 22 and 24 (Fig. II) whereby to simultaneously move sections 144 and 146 of the sleeve 58 in each supercharger in opposite directions to vary the size of openings 80. Timing adjustments of the atmospheric air intake periods can thus be made by means of sleeve 58, as well as by shifting the point of attachment of valve 60 to shaft 50 by the set screw. The hot valve 56 is preferably keyed to shaft 50, but the timing of the gas exhaust periods of the supercharger may be varied by shifting the angular position of the shaft 50 and valve 56 relative to the engine crank shaft at the chain drive sprocket 94.

In Fig. IV, the two apertures 80 in the wall of the left hand side of sleeve 58 as viewed in Fig. III, are illustrated as of unequal area. Fig. XVIII illustrates the construction whereby the relative areas of these two apertures can be varied by rotating sleeve segments 144 and 146 in opposite directions. Sleeve segment 144 consists of a ring to which is attached a cylinder segment 160 which in the preferred design subtends an arc of 115°. Segment 160 extends to the right of ring 144 as viewed in Figs. III and XVIII, with its outer edge forming a close sliding fit with ring 146. Ring 146 carries a corresponding cylinder segment 162 which also subtends an arc of 115° and which extends to the left, as viewed in Fig. XVIII, with its outer edge in close sliding relation to ring 144. Thus the apertures 80 are defined as to length and width by the rings 144 and 146 and their segments 160 and 162. Similarly, apertures 84 and 79 at the right hand side of sleeve 58 may be varied as to relative areas by relative movement of ring 146 with respect to stationary ring 148. Referring to Fig. XVIII, it will be seen that ring 148 is provided with two oppositely disposed cylinder segments 163, 164, one of which in this case subtends an arc of 48°, and the other an arc of 42°. The ends of segments 163 and 164 extend to close sliding relation with ring 146. Ring 146 carries at its right hand side as viewed in Fig. XVIII, a pair of oppositely disposed cylinder segments 165 and 166, one of which subtends an arc of 48°, and the other an arc of 42°. Thus the rings 146 and 148, together with their segments 163, 164, 165 and 166, afford the means for varying the lengths of the air scavenging period and of the compressed air discharge period for the supercharger.

Valves 56 and 60 are designed to rotate with very small clearance within the sleeve bushings 54 and 58. To reduce conduction of heat by the metal parts from the hot end of the supercharger, a heat dam 168 is disposed between housing sections 30 and 48. Other heat dams are provided between chamber 62 and the housing of bearing 131, and circumferentially between the retainer of bearing 131 and the housing.

It is possible to obtain wide adjustments in the timing and intensity of the aspirator effect when operating with a multi-cylinder engine. The aspirator jet 64 has its greatest force during the re-expansion period in the cycle of the supercharger, and reaches a second and smaller peak at about the mid-portion of the exhaust stroke of the piston in the exhausting engine cylinder. Considerable benefit has been obtained by operation of the aspirator 64 prior to the instant of cut-off of transfer of exhaust gases into chamber 52 by valve 56 at point 1b (Fig. IX).

Referring to Fig. VIII, there has been illustrated diagrammatically an arrangement of multiple aspirator jets and interconnected supercharger discharge conduits 74, by means of which it is possible to utilize more efficiently suction impacts developed by one supercharger discharge for promoting efficient scavenging of a second supercharger interconnecetd therewith. Thus, in Fig. VIII, the exhaust lines 74 of superchargers 22 and 24 are interconnected at the throat 169 into a common discharge funnel 170. Each conduit 74 terminates at the throat in the equivalent of a secondary aspirator nozzle adapted to develop suction in the other exhaust line. By this arrangement, the tail end of the scavenging period in one compressor 22 is most efficiently supplied with an additional suction impact produced by the high velocity discharge of gases during the re-expansion portion of the operating cycle of supercharger 24. Similarly, the tail end of the scavenging period in supercharger 24 is boosted by the suction impact developed by high velocity discharge of gases from supercharger 22. The secondary aspirator thus provided at the throat 169 is made up of two concentric orifices, each having an area equal to or slightly smaller than the area of its respective exhaust pipe 74. The cone 170 of the secondary aspirator is of gradual widening cross-sectional area ultimately leading to atmosphere, preferably by way of a muffling device.

Referring to Fig. IX, the exhaust periods of three cylinders, namely 1, 3 and 2, are laid out in the order in which the exhaust ports of these cylinders are operatively connected with supercharger 22 during one complete engine cycle, two engine revolutions corresponding to one circumference of the polar diagram. These exhaust periods are 1a—3a, 3a—2a, and 2a—1a. During this same period, as shown in Fig. X, there are corresponding intake periods in the cylinders 6, 4 and 5, the intake ports of which are operatively connected to the supercharger 22. Such intake periods are shown as 6d—6f, 4d—4f, and 5d—5f. It should be noted that the part 6e—6f of the intake period 6d—6f, terminates the intake in cylinder 6, and the period 4d—4e introduces the intake period in cylinder 4. Figs. XI and XII illustrate the corresponding exhaust periods and intake periods for the cylinders which are operatively connected with pump 24.

Returning to Fig. IX, the period 1b—1c measures the gas re-expansion period within the supercharger during which the pressure developed by the exhaust gas puff wave recedes throughout the total of interconnected spaces including the exhausting cylinder 1, exhaust manifold 26 and conduit 28, supercharger space 52, and the carburetor 42 and intake manifold 40 (see Fig. XIII). The intaking cylinder 6 is cut off at 1b by its intake valve to maintain therein the pressure developed by the supercharging operation which terminates at points 1b or 6f. The time interval subtended by the angle arc 1b—1c extends from the peak of the pressure wave down to atmospheric pressure, and in regular performance occupies between 30° to 60° crank angle travel, depending on the speed of the engine and the size of the port openings 70, 72, 71. During this period, a pressure obtains outside of the cylinder intake valves in the manifold 40, and this pressure gradually drops. During the major portion of this period 1b—1c, the intake valve of cylinder 4 remains closed 6f—4d, and begins to open at 4d only when the pressure wave in the manifold 40 has pretty well subsided. If, however, the intake valve of cylinder 4 were to open earlier, then obviously the receding pressure wave in manifold 40 would penetrate into the clearance space of cylinder 4 during the very early part of its intake stroke. If in addition the exhaust valve of cylinder 4 were simultaneously kept open with sufficient overlap, then there would be a welcome opportunity for scavenging any residual exhaust gases in the cylinder from the clearance space and filling the cylinder with fresh air from the intake manifold.

According to the preferred operating cycle, one engine cylinder exhaust valve (for example the exhaust valve of cylinder 1) opens about 30°–45° before bottom dead center of the piston in the cylinder on its working or power stroke. During the following 90° crank angle movement of the piston, pressure in the exhausting cylinder drops rapidly from an initial pressure of about 50 lbs. per square inch absolute down towards atmospheric pressure. If during this period the engine is not connected to the supercharger (i. e. with butterfly valve 98 open and valve 99 closed), exhaust gases discharge from the cylinder into the exhaust manifold 26, and thence into exhaust pipe 37, from which they exit without substantial interference to atmosphere. With the engine discharging directly to atmosphere, a regular full throttle wave travels through the exhaust manifold, peak pressure of which is developed substantially at the time that the piston in the exhausting cylinder is passing through its bottom dead center position.

In Fig. XV the supercharger port openings are plotted as to time (degrees valve angle and degrees crank angle). A complete supercharger cycle has a length of 240° crank angle. Thus if the supercharger cycle begins at a point 30° crank angle before bottom dead center, the cycle finishes 240° later at 30° crank angle after top dead center. The puff intake and discharge ports of the supercharger chamber 52 (both hot gas and cold air) open at the same time, namely about 30° crank angle before bottom dead center. The various curves in the diagram analyze one complete supercharger cycle in its timing relative to one coordinated pair of engine cylinders, as for example, cylinders 1 and 6 (indicated by their respective dead center lines); i. e. relative to the power and exhaust strokes of cylinder 1, and to the intake stroke of cylinder 6. Curves 11, plotted at the top of the diagram, measure the length of the atmospheric air transfer port openings 92, 80, 78, of the supercharger, when the engine is operating under normal operating conditions without supercharging.

When cylinder 1 is operatively connected to the supercharger 22 during its exhaust period, the puff exhaust gas discharge wave which enters the compressor chamber 52 compresses the air charge within the compressor and interconnected spaces until the total mass of air and gas has reached a balancing pressure. If at the same time cylinder 6 is operatively connected to the supercharger, valve 60 of the supercharger operates to cut off the supply of atmospheric air to cylinder 6 and to connect the supercharger space 52 with the intake port of the cylinder to permit transfer of compressed air from the supercharger through the carburetor and intake manifold into this cylinder during the latter part of its intake period and during the period when the piston therein is just starting its compression stroke. When the piston in the air intaking cylinder 6 reaches a point in its travel about 40°–60° crank angle beyond bottom dead center position on the compression stroke, its air intake valve closes. During this period of transfer of air from the supercharger to the cylinder 6 substantially the entire original air charge for the supercharger is discharged under substantially the peak pressure impressed thereon by the puff exhaust wave from exhausting cylinder 1 of the engine. At the instant that the intake valve of cylinder 6 closes (period 6f of Fig. X), the interior of the supercharger 22 is still communicably connected with the intake manifold 40. However, at this instant the valve 56 of the supercharger operates to cut off at 1b (Fig. IX) any further supply of hot exhaust gases from cylinder 1 to the supercharger, and to open the supercharger for discharge of gas therefrom to atmosphere through the exhaust funnel 74.

Curves 12 in the chart (Fig. XV) plot the length of the atmospheric air transfer port openings of the supercharger when the engine is operating with supercharging. Thus this diagram follows up operation of the valve port openings shown in Fig. IV over one complete supercharger revolution. When the engine is operating with supercharging, the atmospheric air intake finishes and the puff intake of cylinder 6 begins at a point 30° crank angle before bottom dead center. Curves 13 plot the length of the puff intake period through ports 82, 79, 77 (shown in Fig. V).

As soon as supercharger valve 56 opens to discharge gas into funnel 74, a rapid discharge takes place as a result of suction developed by the final transfer of exhaust gases from cylinder 1 to the aspirator nozzle 64 during the stroke portion of the cylinder exhaust period. The suction thereby developed quickly reduces the pressure within the supercharger to a point below atmospheric pressure. Curves 14 at the bottom of the chart (Fig. XV) plot the length of the puff exhaust period of the supercharger cycle. This puff exhaust period extends in this particular example over 88° crank angle, and the puff intake ports (curve 13) stay open over 120° crank angle, thus allowing for re-expansion within the supercharger over a period of 120° minus 88° equals 32° crank angle.

At the end of the re-expansion period valve 60 disconnects space 52 from the intake manifold and carburetor and brings ports 82 into register with atmospheric air intake ports 84 and 85, thus permitting influx of fresh scavenging air to the supercharger preparatory to operation of the supercharger on a second cycle, during which the exhausting cylinder is cylinder 3, and the cylinder taking in supercharged air is cylinder 4. Curves 15 (Fig. XV) plot the lengths of the scavenging air port openings (Fig. V) 82, 84, 85. The length of time covered by one curve 13 and one curve 15 represents one half revolution of the supercharger, or one operating cycle. However, the individual lengths of the port openings plotted by 13 and 15 may be varied by shifting the sleeve sections 144 and 146. The range of this possible variation in air port openings is indicated by the slope of dotted lines 16. Between curves 14, curves 17 plot the lengths of the reexpansion and scavenging period. Both these periods are controlled by the ports 66, 68, 70, 71 and 72 shown in Fig. VI. Curves 18 at the bottom of Fig. XV plot the lengths of the aspiration periods, with certain idling periods between, as controlled by ports 76, 66, 67, illustrated in Fig. VII.

In Fig. III the supercharger ports are shown at the position which they occupy during the period of puff supercharging. The positions of the ports which are illustrated in Figs. IV to VII inclusive, represent the instant about 45° crank angle after the beginning of the puff period, i. e. when the exhaust gas inlet port 70 of the supercharger is fully open (the peak of curve 14). At this time the puff air discharge port 82 has still about 11° crank angle to move to reach full open position. The vertical dotted line on the chart (Fig. XV) locates the instant of full opening of exhaust gas intake ports 70 (Figs. III to VII).

It will be appreciated that the air scavenging of the compressor can be effected without developing suction by means of an aspirator, and without supplying scavenging air at atmospheric pressure. Thus scavenging air may be supplied to the air intake end of the compressor, under the positive pressure furnished by a fan or blower. Likewise the invention is not limited in other respects to the specific apparatus which has been described. For example, the invention contemplates a supercharger in which the casing or shell may be rotatable and the cylindrical valves stationary, and in which other means may be substituted for those specifically described whereby to vary the timing and/or area of the gas and air transfer port openings.

The invention having been thus described, what is claimed as new is:

1. In energy conversion apparatus, an internal combustion engine having a plurality of cylinders and pistons reciprocably mounted therein, valved air intake and gas exhaust ports for each cylinder, a plurality of engine exhaust manifolds each communicably connected with the exhaust ports of cylinders the operating cycles of which follow each other in sequence with a crank angle spacing of at least 180°, a plurality of engine intake manifolds each communicably connected with the intake ports of cylinders the operating cycles of which follow each other in sequence with a crank angle spacing of at least 180°, a plurality of displacement compressors each comprising an elongated cylindrical chamber, a shaft mounted longitudinally within said chamber, said shaft and chamber being relatively rotatable, conduits communicably connecting each engine exhaust manifold with an end of one of the compressors, a gas discharge outlet ported out of each compressor at said end thereof, and a ported cylinder valve mounted on said shaft in position to control communication between the interior of the compressor and the corresponding engine exhaust manifold and compressor discharge outlet, each compressor having at its opposite end a valved atmospheric air intake and a valved compressed air discharge outlet.

2. Apparatus as defined in claim 1, together with conduits communicably connecting the air discharge outlets of each compressor with an intake manifold for engine cylinders operating on a cycle having a 360° crank angle spacing with respect to the cylinders which are operatively connected through their exhaust manifold with the gas intake end of the same compressor, a ported cylinder valve mounted on the shaft at the air intake and discharge end of each compressor in position to control the opening and closing of the air intake and discharge ports.

3. Apparatus as defined in claim 1 in which the intake ports of cylinders operating on cycles which are less than 180° apart in phase are Siamesed, said apparatus including a ported switching valve and actuating mechanism therefor mounted in position to switch each of said Siamesed intake ports into communicable connection with its proper intake manifold.

4. Apparatus as defined in claim 1, together with an aspirator having a pressure nozzle mounted in operative relation to each compressor gas discharge outlet, a second passage communicably connecting the nozzle of the aspirator with the engine exhaust manifold, and ports in said cylinder valve for controlling the opening and closing of communication between the compressor, the engine exhaust manifold, and the aspirator nozzle.

5. In energy conversion apparatus, an internal combustion engine having a plurality of cylinders and pistons reciprocably mounted therein, valved air intake and gas exhaust ports for each cylinder, a pair of engine exhaust manifolds each communicably connected with the exhaust ports of cylinders the operating cycles of which follow each other in sequence with a crank angle spacing of at least 180°, a pair of engine intake manifolds each communicably connected with the intake ports of cylinders the operating cycles of which follow each other in sequence with a crank angle spacing of at least 180°, a pair of displacement compressors each comprising an elongated cylindrical casing, a shaft mounted longitudinally within said casing, said shaft and casing being relatively rotatable, a hot gas intake and a gas discharge outlet ported out of each compressor at one end thereof, an atmospheric air intake and a compressed air discharge outlet ported out at the opposite end of each compressor, a conduit communicably connecting the air discharge outlet of each compressor with an engine intake manifold, another conduit communicably connecting the gas intake port of each compressor with an engine exhaust manifold, a pair of ported cylinder valves mounted respectively on the shaft at opposite ends of a compressor in position to control the opening and closing of each of the gas and air intakes and discharge outlets, and an aspirator mounted in operative relation to each compressor gas discharge outlet.

6. Apparatus as defined in claim 5, together with conduits communicably connecting the gas discharge outlets and aspirator attachments of each compressor, each of said conduits having its point of intercommunication terminating in a second aspirator consisting of concentric nozzles.

7. Apparatus as defined in claim 5, together with a float controlled carbureter operatively connected with each intake manifold, pressure balancing connections between the intake manifold and the float controlling feed of fuel to the carbureter, adjustable orifices in each pressure balancing connection, and a check valve in the fuel feed connection to the float chamber.

8. In energy conversion apparatus, a four-cycle internal combustion engine having a pair of cylinders with pistons mounted therein, said cylinders each having a valved gas exhaust port and a valved air intake port and being timed for operation on power strokes with a 360° crank angle spacing, a displacement compressor comprising an elongated walled chamber, a hot gas transfer conduit communicably connecting one cylinder exhaust port with one end of the compressor, a gas discharge outlet ported out at the same end of the compressor, a single valve mounted to control communication between the compressor and the hot gas transfer conduit and gas discharge outlet, an atmospheric air inlet ported out in the opposite end of the compressor, a pressure air discharge outlet ported out from the end of the compressor last referred to, an air transfer conduit communicably connecting the other cylinder intake port with the air discharge outlet, a single valve mounted to control communication between the compressor and the air transfer conduit and the atmospheric air inlet, and means for actuating and timing said valves to communicably connect the cylinders through the compressor chamber at one period of the compressor cycle, and to block such communication and open the compressor gas discharge and air inlet ports for scavenging at a later period of the cycle.

9. In energy conversion apparatus, an internal combustion engine having a plurality of cylinders and pistons reciprocably mounted therein, valved air intake and gas exhaust ports for each cylinder, an exhaust manifold communicably connected with the exhaust ports of cylinders the operating cycles of which follow each other in sequence with a crank angle spacing of at least 180°, an intake manifold communicably connected with the intake ports of cylinders the operating cycles of which have a 360° crank angle spacing with respect to cylinders which have their exhaust ports connected to the exhaust manifold, a displacement compressor comprising an elongated cylindrical chamber, a hot gas intake port and a gas discharge outlet at one end of said chamber, a conduit communicably connecting the engine exhaust manifold with the compressor hot gas intake, a ported cylinder valve rotatably mounted to control communication between the interior of the compressor and the engine exhaust manifold and gas discharge outlet, an air intake port and an air discharge outlet at the other end of the compressor, a conduit communicably connecting the compressor air discharge outlet with the engine intake manifold, a ported cylinder valve mounted to control communication between the interior of the compressor and the engine intake manifold and compressor air intake port, and means for actuating and timing said valves to communicably connect the said intake and exhaust manifolds through the compressor chamber at one period of the compressor cycle, and to block such communication and open the compressor gas discharge outlet and air intake port for scavenging at a later period of the cycle.

10. Apparatus as defined in claim 9, together with ports in the cylinder valve and compressor at the air intake and air discharge end of the compressor arranged for switching the cylinders of the engine which are operatively connected to the compressor between atmospheric air intake and compressed air supercharging.

JOHANN J. WYDLER.